Jan. 21, 1941.         J. A. MERRILL         2,229,582
TREATMENT OF LATEX, ETC
Filed May 16, 1936
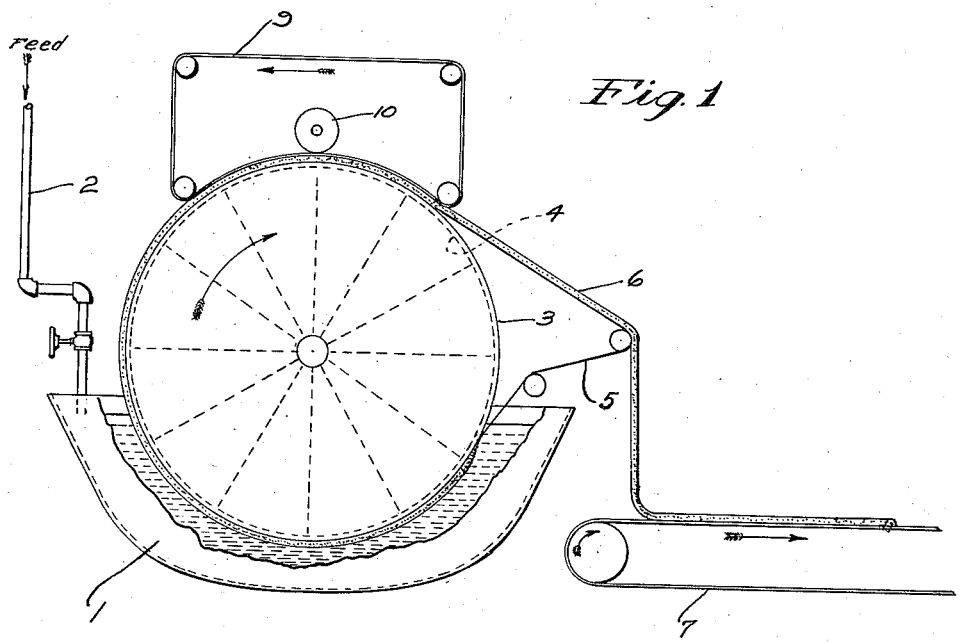
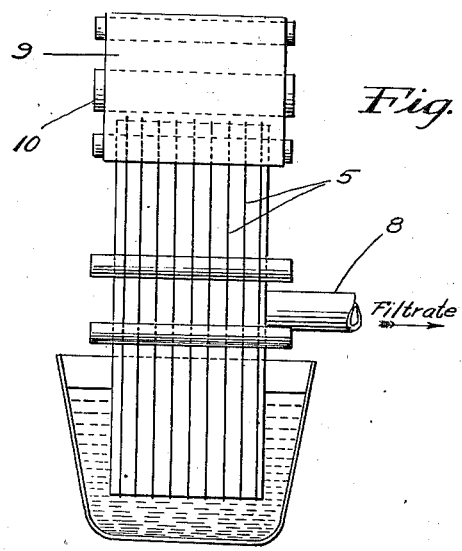
Inventor
James A. Merrill
By
Attorney Patented Jan. 21, 1941

2,229,582

UNITED STATES PATENT OFFICE 2,229,582

TREATMENT OF LATEX, ETC.

James A. Merrill, Akron, Ohio, assignor to Wingfoot Corporation, Wilmington, Del., a corporation of Delaware Application May 16, 1936, Serial No. 80,172

5 Claims. (Cl. 210—204)

This invention relates to the treatment of latex and latex compositions and to a new filter and process of filtering designed more particularly for use in the treatment of latex and latex compositions. The invention relates more particularly to the use of rayon filters in the filtration of flocculated latex and compositions comprising flocculated latex. It includes the preparation of a granulated rubber or rubber powder from latex by an improved method which includes the addition of both soap and a protein such as casein to the latex and thereafter flocculating, filtering and then disintegrating. The invention includes a new process of continuous filtering.

The invention will be described more particularly as applied to the filtration of flocculated aggregates of natural rubber latex although it applies also to the filtration of flocculated aggregates of similar materials such as gutta percha, balata, etc. and artificial dispersions of these and similar materials such as synthetic rubbers, etc.

Difficulty has been experienced in the filtration of flocculated latex and latex compositions due to the fact that small aggregates of the flocculated latex adhere to the usual filter cloths, clogging the openings, thus retarding and eventually stopping the passage of filtrate through the cloths. This adherence of latex aggregates to the filter cloths greatly hampers filtration and it has been impossible to filter such materials by any continuous process.

According to this invention filaments of the usual cellulosic rayons are employed as a filtering medium. Regenerated cellulose, cellulose nitrate and other extruded cellulosic filaments may be used. The rayon is preferably woven into a cloth and the preferred filtering medium is a cloth formed from rayon filaments the warp or woof or both of which is only slightly twisted. This gives a loose filtering medium which permits the passage of filtrate between the individual filaments whereas when tightly twisted bundles of rayon are used in both the warp and woof the passage of the filtrate is confined to the openings between the bundles.

For example, I have compared the filtration of compositions comprising flocculated latex through three rayon filter cloths having the following specifications:

A microscopic examination of these three filter cloths is given in the following table:

| Cloth | Warp | Fill | Percent | Openings, shape and size |
|---|---|---|---|---|
| #1 | .0067″ wide and .00065″ apart. | .0059″ wide and .0042″ apart. | 2.4 | Shape.—Between an elongated diamond and a double convex lens. Size.—Widest part about .001″ and generally .001″ long. |
| #2 | .0065″ wide and in contact side by side. | .0011″ wide and .0038″ apart. | 1.1 | Shape.—Long and narrow. Size.—Largest were .001″ wide and .0035″ long but mostly were much narrower and usually shorter. |
| #3 | .0065″ wide and in contact side by side. | .0013″ wide and .0034″ apart. | 1.3 | Same as #2. |

In using filter cloths of this type for the filtration of aqueous preparations in which the latex particles have been flocculated into filterable aggregates it will be found that with a cloth of the type indicated above as #1 the filtrate passes through the several openings but not through the threads themselves whereas in the type indicated above as #2 and #3 a considerable portion of the filtrate passes through the thin, flat warp threads where these are not crossed by the fill threads. The loosely twisted material is therefore preferable for filtration.

Various flocculated latex compositions may be filtered through these rayon filters. The latex may contain little or no added solid material. For example, latex which has been flocculated by a heavy metal salt gives aggregates which may be filtered by means of a rayon filter. This latex composition may be prepared as follows:

*Example 1.*—Five hundred cc. latex are diluted with 500 cc. water and slowly added to a solution of 15 grams $ZnSO_4$ in 1000 cc. water. The zinc sulfate flocculates the latex into aggregates which may be filtered out by a rayon filter. Any suitable continuous filter may be used.

For many purposes it is desirable to add solid materials to the latex before filtering. For example, U. S. Patent 2,019,055 granted October 29, 1935 to Royce J. Noble describes the prepara-

|  |  | Twist T. P. I. | Denier | Tensile, gms. | Elong., percent | G/D | Threads per in. | Mullins test, lb./in.² | Wt. of fabric, oz./yd.² |
|---|---|---|---|---|---|---|---|---|---|
| #1 | Woof (pick) | 35.2 | 110 | 280 | 10.6 | 2.54 | 102 | 141 | 3.59 |
| | Warp | 6.4 | 115 | 225 | 9.2 | 1.96 | 102 | | |
| #2 | Woof (pick) | 2.0 | 154 | 233 | 13.2 | 1.51 | 67 | 88 | 2.77 |
| | Warp | 3.8 | 73 | 97 | 3.9 | 1.33 | 153 | | |
| #3 | Woof (pick) | 3.9 | 135 | 228 | 14.8 | 1.69 | 67 | 90 | 2.77 |
| | Warp | 2.2 | 75 | 87 | 3.5 | 1.16 | 154 | | |

(In the table, T. P. I. means turns per inch and G/D means grams per denier.)

ration of granulated rubber by adding casein, albumen, soaps and the like to latex, flocculating and then filtering and disintegrating the filter cake. The usual filtering mediums are not suitable for continuous filtration of such a product because they become clogged in a relatively short time. However, any of the compositions described in this Noble patent may be filtered continuously through a rayon filter without clogging. Cotton filter cloths were not satisfactory for the filtration of such compositions for more than 10 to 15 hours continuous filtering. Rayon cloths have been run for 40 hours without any drop in efficiency. Cotton cloth subjected to ordinary mercerization was satisfactory for only about 10 hours.

Other solid ingredients which will be referred to herein as diluents may be added to the latex for various purposes. The invention relates to the filtration of compositions of flocculated latex regardless of whether or not they contain a diluent.

The filters employed may advantageously be continuous filters and any type of continuous filter suitable for use with a rayon filter cloth may be used in carrying out this invention. A suitable type is shown in the accompanying drawing in which Fig. 1 is an elevation which shows the filter in operation and Fig. 2 is an end view of the discharge end of the filter when not in operation.

The flocculated latex composition is introduced into the pan 1 through the feed line 2, or the latex may be flocculated in the pan 1. The feed may be a latex slurry which contains, preferably 6–12% of solids. This is deposited onto the rayon filter cloth 3 in the usual manner. The filter cloth is supported on the drum 4 which is rotated in the direction of the arrow. Over the filter cloth are strings 5 which may be spaced 3/8 to 1/2" apart for removing the filter cake from the filter cloth. Fig. 1, shows the filter cake 6 being removed from the drum by the strings and deposited onto the conveyor belt 7. A vacuum is applied to the hollow axis of the drum 8 through which the filtrate is discharged. This vacuum is applied to the filter cloth soon after it dips into the slurry and is released just before the filter cake passes out from under the compression belt 9. The usual means for applying and releasing the vacuum may be employed. In addition to the compression belt the compression roll 10 may be used to advantage. The compression belt 9 and the strings 5 are preferably made of rayon. The compression belt may be made of other smooth surfaced filaments such as wire, glass, etc. Rayon is used for the filter cloth because it is difficult or impossible to produce a filter cloth from such other material in which the filaments are maintained under uniform tension. It will be found that a cotton belt and strings become caked with flocculated aggregates of latex and hinder continuous filtration.

The filter is employed in the usual way. As the drum covered with the filter cloth 3 enters the slurry in the pan 1, vacuum is applied. This draws the liquid of the slurry through the filter cloth and deposits the solids on the surface. The filtrate is discharged through the exit pipe 8. The compression belt and main compression roll aid in the removal of liquid from the filter cake by preventing the development of cracks in the cake which would cause a drop in vacuum. The filter cake is removed from the filter cloth by the strings 5 and is carried over and deposited onto the conveyor belt 7. The filter cake obtained from a slurry of latex and diluent such as that described in the Noble patent may, for example, contain 30 to 60% of liquids but preferably about 45%. The filter cake may be treated in any desired manner to remove the balance of the water and then pulverized and dried or it may be utilized in any way desired.

A further improvement over Noble 2,019,055 comprises the use of a small amount of casein and a small amount of soap in the preparation of the latex slurry. This is advantageous in that it reduces the amount of casein present in the product. The composition may, for example, be prepared as follows:

Example 2.—A solution of 3600 grams crystalline zinc sulfate in 5 gallons of water was poured into a 100 gallon drum and diluted to 50 gallons. Into this solution was poured 20 gallons 39–40% latex which had previously been diluted with 22.5 gallons of water and to which had been added 6.0 liters of 10% casein solution, 986 grams concentrated hydrochloric acid diluted to 5 gallons, and 242 grams stearic acid plus 34 grams NaOH in 4 liters of water. This gives 100 gallons of suspension calculated to have 1% zinc stearate and 1% casein on the rubber, a pH of approximately 7.5 and total solids of 8%. This composition was filtered through rayon and then dried and powdered or granulated. It can readily be filtered through a continuous filter of the type shown, with as complete removal of the filter cake from the rayon filter cloth as is customary in other filtrations in which cotton cloth is used.

In referring to the drawing the operation of the filter has been described only as applied to the filtration of flocculated latex and the like, and the use of a compression belt of rayon or other extruded fibres has been described only in that connection. But such a compression belt may advantageously be used in other filtering operations. In many filtrations where a cotton filter cloth is used the compression belt is advantageously made of smooth extruded filaments. This invention includes the process of continuous filtration with such a belt.

The advantages will appear from a comparison of the filtration of flocculated latex on a filter of the type shown in the drawing, using compression belts of cotton and rayon. It was found that a cotton compression belt gradually became caked and after about 10 to 12 hours operation a film about 1/16 to 1/8" thick had accumulated on the belt. This gradual accumulation continued until the belt had to be discarded because of the bulk of rubber which could not be removed without damaging the belt. The rayon compression belt can be used indefinitely.

The accumulation of a film of precipitate on the cotton compression belt is not limited to the filtration of materials which clog cotton filter cloths. Even where cotton filter cloths may be used satisfactorily, it may be advantageous to employ a rayon compression belt. The filter cloth is repeatedly submerged in the slurry and there is no opportunity for an accumulation to be built up upon it by drying. The compression belt, however, is never submerged and in many operations the drying of precipitate on the belt gradually forms a film which lessens its effectiveness by preventing the passage of air through the openings in the belt. Furthermore, the accumulation on the belt may cause it to become stiff and unmanageable. In such cases, it is advantageous to use a compression belt of smooth extruded filaments which does not pick up any of the cake and remains clean, even though a cotton filter cloth is employed. An additional advantage of rayon lies in the fact that it will absorb water from the cake while it is in contact with it, and this water is partially or wholly removed by evaporation as the belt passes around over the upper rolls.

I claim:

1. The process of filtering flocculated rubber latex aggregates which comprises removing liquid from a slurry of said aggregates through a filter cloth composed substantially entirely of rayon.

2. The process of filtering flocculated rubber latex aggregates which comprises filtering them through a filter cloth composed substantially entirely of rayon and comprising loosely twisted rayon filaments.

3. The method of continuously filtering flocculated rubber latex aggregates which comprises continuously separating the aggregates from suspending medium by passing the suspending medium through one portion of an endless filter cloth composed substantially entirely of rayon, continuously removing the precipitated aggregates from another portion of the cloth and thereafter separating further aggregates from suspending medium by means of the cloth as a part of the one continuous filtration.

4. The method of continuously filtering flocculated rubber latex aggregates from an aqueous suspending medium which comprises simultaneously and continuously performing the following steps on an endless filter cloth composed substantially entirely of rayon while continuously moving the cloth so that the portion of the cloth on which each step of the cycle is being performed is being constantly changed and each portion of the cloth passes through the steps of the cycle in the order named, the steps being (1) separating the aggregates from the suspending medium by passing the suspending medium through the cloth (2) pressing onto the precipitate thus formed with a compression belt composed substantially entirely of rayon to compress the precipitate into a compact cake and (3) separating the compact cake from the filter cloth.

5. The method of continuously filtering flocculated rubber latex aggregates from an aqueous suspending medium which comprises simultaneously and continuously performing the following steps on an endless filter while continuously moving the filter so that the portion on which each step of the cycle is being performed is being constantly changed and so that each portion of the filter passes through the steps of the cycle in the order named, the steps being (1) separating the aggregates from the suspending medium by passing the suspending medium through the filter (2) pressing onto the precipitate thus formed with a compression belt composed substantially entirely of rayon to compress the precipitate into a compact cake, and (3) separating the compact cake from the filter.

JAMES A. MERRILL.